Patented Nov. 2, 1937

2,098,204

UNITED STATES PATENT OFFICE 2,098,204

PHENOLIC CHLOROETHERS

Herman A. Bruson, Philadelphia, Pa., assignor to Röhm & Haas Company, Philadelphia, Pa.

No Drawing. Application May 15, 1937,
Serial No. 142,808

5 Claims. (Cl. 260—150)

This invention relates to new phenols having the general formula

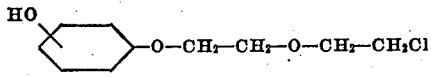

and a process for preparing same.

Compounds of the above formula are prepared according to the present invention by heating $\beta,\beta'$-dichloro-diethyl ether with a dihydric monocyclic phenol in the presence of a hydroxide or carbonate of an alkali metal or of an alkaline earth metal, said hydroxide or carbonate being used in an amount substantially equivalent to that theoretically required to react with only one of the phenolic hydroxyl groups.

It is advantageous to carry out the reaction in the presence of water, or an inert solvent, such as alcohol, dioxane, or toluene, under a reflux condenser with efficient agitation at a temperature of from about 85° to 115° C.

The process is applicable in particular to resorcinol, hydroquinone, pyrocatechol, and their nuclear alkyl substitution products.

A typical procedure consists in mixing one molecular equivalent of the monocyclic dihydric phenol with from 1 to 4 molecular equivalents of $\beta,\beta'$-dichlorodiethyl ether, and substantially 1 mol. equivalent of sodium hydroxide or potassium hydroxide; or 0.5 mol. equivalent of sodium carbonate, potassium carbonate, or barium hydroxide, together with water, and heating the mixture at the boiling point, with rapid stirring under reflux, for from about six to twelve hours, the time of heating depending upon the size of the batch.

The reaction mixture can then be conveniently worked up by distilling off the water, filtering off the metal chloride formed, and fractionating the clear filtrate under reduced pressure to isolate the desired product, which can be further purified, if necessary. An alternative procedure is to extract the reaction mixture with caustic alkali and acidify the alkaline extract, whereupon the crude product which precipitates as an oil can be purified by distillation in vacuo.

The new phenols distill over as colorless or pale yellow oils, some of which crystallize in the cold. They are useful as germicides, antiseptics, or fungicides, as intermediates for the preparation of insecticides, mothicides, drugs, tanning agents, resins, and textile assistants.

The following examples are given to illustrate this invention:

Example 1

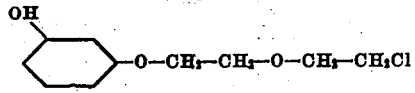

The following mixture was boiled with rapid agitation under a reflux condenser for 8 hours at 100–103° C.:

Resorcinol _____ grams__ 106
Potassium carbonate (anhydrous) ____ do ____ 69
Water _____ cubic centimeters__ 250
$\beta,\beta'$-Dichloro-diethyl ether _____ grams__ 286

The reaction product was cooled and extracted with two 400 cc. portions of 10% caustic soda solution. The alkaline extract was shaken with a little ether to remove neutral impurities, and then acidified with dilute hydrochloric acid. The heavy dark oil which precipitated was separated and washed with warm water to remove unchanged resorcinol. The washed oil was then fractionally distilled under reduced pressure. The product distilled as a colorless oil at 184–190° C./2 mm. Upon redistillation, it boiled sharply at 184–186° C./2 mm., and solidified on cooling to a colorless, crystalline mass. The compound may be crystallized from benzene, from which it separates on chilling as fine, matted needles, melting at 46–47° C. It is insoluble in water, readily soluble in alcohol, ether, or dilute caustic soda solution, and difficultly soluble in cold benzene or petroleum ether.

Example 2

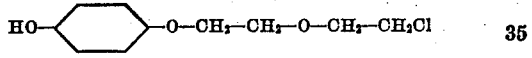

The following mixture was boiled with rapid agitation under a reflux condenser for 10 hours at 100° C.:

Hydroquinone _____ grams__ 110
Barium hydroxide (Ba(OH)$_2$.8H$_2$O) __ do ____ 159
Water _____ cubic centimeters__ 500
$\beta,\beta'$-Dichloro-diethyl ether _____ grams__ 286

The reaction product was worked up as described in Example 1.

The product distilled at 174–178° C./2 mm. as a pale yellow oil. It solidified to a crystalline mass on prolonged cooling. It may be crystallized from benzene in the form of colorless prisms melting at 44° C.

Example 3

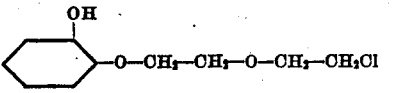

A mixture consisting of 55 g. pyrocatechol, 22 g. sodium hydroxide, 286 g. β,β'-dichlorodiethyl ether, and 25 cc. of water, was heated for 8 hours at 110–115°, with stirring, under a reflux condenser. The reaction mixture was distilled to remove the water. The sodium chloride was filtered off, and the clear filtrate distilled under reduced pressure. The fraction boiling at 136–157° C./2 mm. was collected. It was purified by dissolving in dilute sodium hydroxide solution and removing traces of insoluble material by means of ether. After acidification with dilute hydrochloric acid, the oil layer formed was washed with water and distilled in vacuo. It came over as a colorless oil, B. P. 141–143° C./2 mm.

What I claim is:

1. A phenol having the general formula

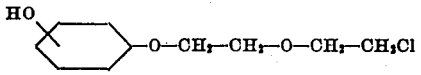

2. β - (p - hydroxyphenoxy) - β' - chlorodiethyl ether.

3. β - (m - hydroxyphenoxy) - β' - chlorodiethyl ether.

4. β - (o - hydroxyphenoxy) - β' - chlorodiethyl ether.

5. A process for preparing phenols having the formula

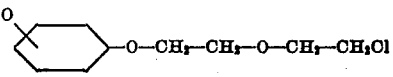

which comprises heating a dihydric monocyclic phenol with β,β'-dichlorodiethyl ether in the presence of a base which is a member of the group consisting of hydroxides and carbonates of alkali metals and alkaline earth metals, said base being employed in an amount substantially equivalent to that required to react with only one phenolic hydroxyl group of the dihydric phenol used.

HERMAN A. BRUSON.